Aug. 27, 1935.  E. L. KRAFT  2,012,763
VENTILATOR
Filed March 2, 1933  3 Sheets-Sheet 1
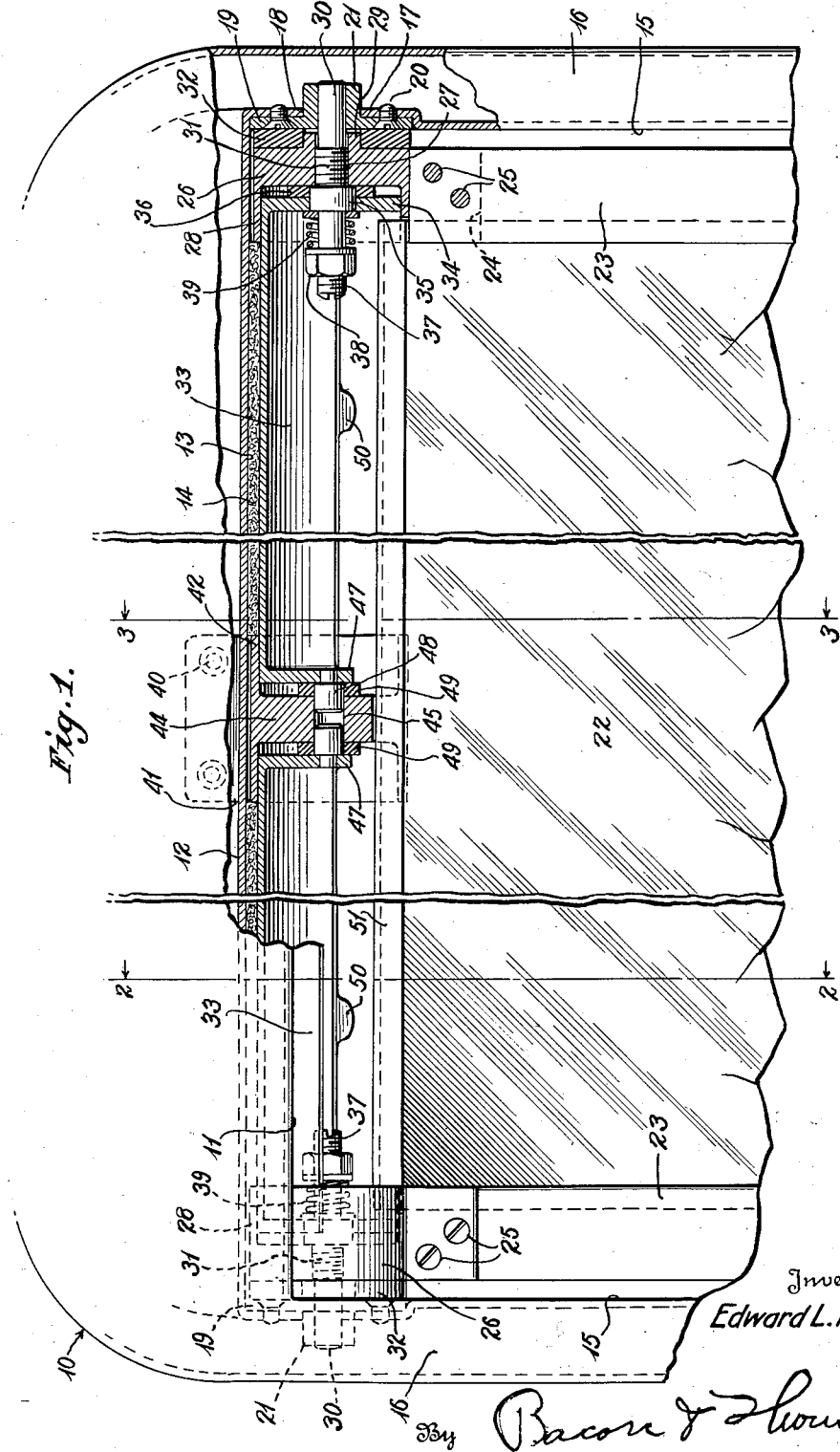
Inventor
Edward L. Kraft
By Bacon & Thomas
Attorneys

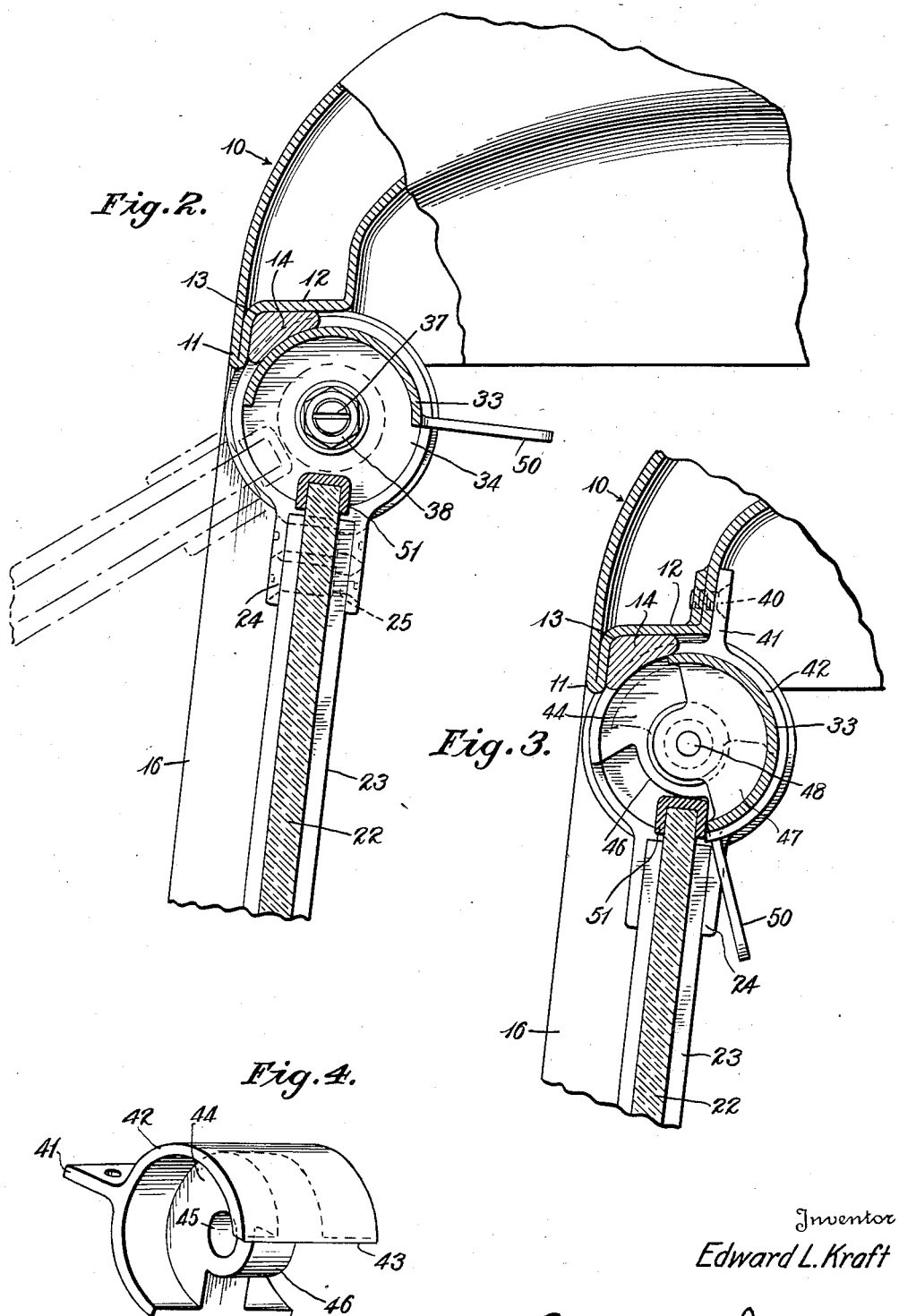

Aug. 27, 1935.  E. L. KRAFT  2,012,763
VENTILATOR
Filed March 2, 1933    3 Sheets-Sheet 3
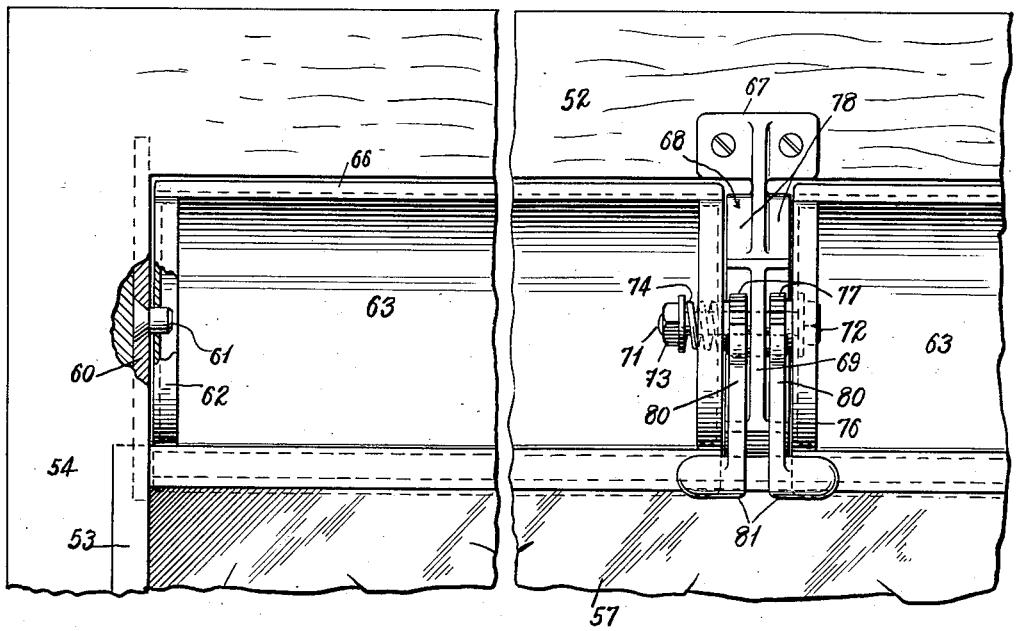
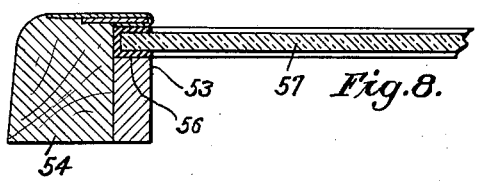
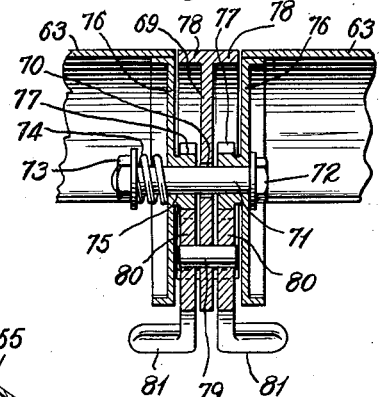
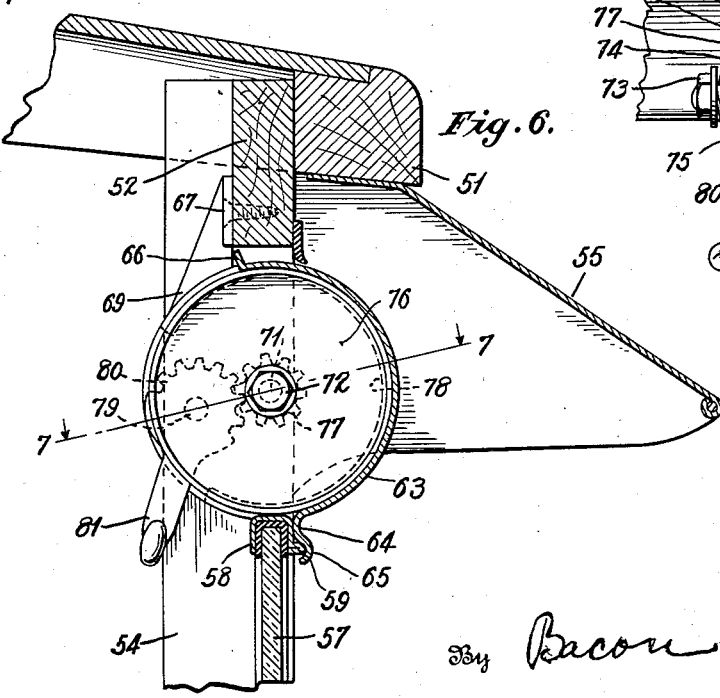
Inventor
Edward L. Kraft
By Bacon & Thomas
Attorneys Patented Aug. 27, 1935

2,012,763

UNITED STATES PATENT OFFICE 2,012,763

VENTILATOR

Edward L. Kraft, York, Pa., assignor to Martin-Parry Corporation, York, Pa., a corporation of Delaware Application March 2, 1933, Serial No. 659,383

5 Claims. (Cl. 296—94)

This invention relates to new and useful improvements in ventilators for closed vehicle bodies.

In my co-pending application, Serial No. 659,384 filed March 2, 1933, I have disclosed and claimed the idea of employing two separately adjustable ventilator members for controlling the passage of air through a single opening in a wall of a vehicle body, with means common to both movable ventilator members for mounting the same upon the marginal portions of the opening. The present invention embodies the use of three independently movable ventilator members for controlling the passage of air through a single opening in a wall of a motor vehicle.

The primary object of this invention is the provision of three relatively movable and independently operable ventilator members for controlling the passage of air through a single opening in a wall of a motor vehicle body.

A further object of the invention is to provide mounting means common to all of the ventilator members for pivotally attaching the same to the marginal parts of the opening to be controlled.

A still further object of the invention is to provide a novel two-part auxiliary ventilator which is cooperatively associated with a main ventilator member so that the two parts of the auxiliary ventilator and the main ventilator may be selectively or independently operated to collectively control a ventilating opening in a vehicle body.

A specific object of the invention is to provide a pivoted windshield having a glass panel which terminates in spaced relation with respect to a marginal part of the windshield opening for providing an auxiliary ventilating space with a plurality of independently operable auxiliary ventilating members arranged to control the passage of air through the auxiliary ventilating space.

Other objects and advantages of the invention will be apparent during the course of the following description:

In the accompanying drawings forming a part of this specification and in which like numerals are employed to designate like parts throughout the same, Figure 1 is a partly elevational view and partly sectional view of ventilator mechanism embodying this invention;

Figure 2 is a vertical sectional view taken on line 2—2 of Fig. 1;

Figure 3 is a vertical sectional view taken on line 3—3 of Fig. 1;

Figure 4 is a perspective view of a mounting member employed for supporting adjacent ends of axially aligned auxiliary ventilator members shown clearly in Fig. 1;

Figure 5 is a fragmentary elevational view, partly broken away, of a modified form of ventilator mechanism from that shown in Figs. 1 to 4 inclusive;

Figure 6 is a vertical sectional view of the ventilator mechanism disclosed in Fig. 5;

Figure 7 is a transverse, substantially horizontal sectional view taken on line 7—7 of Fig. 6; and Figure 8 is a fragmentary horizontal sectional view of the windshield and its mounting, as shown in Figs. 5 and 6.

Referring particularly to the form of the invention shown in Figs. 1 to 4 inclusive, wherein for the purpose of illustration is shown one embodiment of this invention, the numeral 10 designates the roof of a closed vehicle body. This roof is of hollow construction and is formed with a depending lip or flange 11 at its forward edge which cooperates with a flat edge surface 12 to form a pocket 13 for the reception of a sealing or packing strip 14 which functions in a manner to be described at a later point.

This edge of the roof forms one marginal part of the windshield opening 15. While this invention is illustrated and described as consisting of ventilator members for controlling the passage of air through the conventional windshield opening of a closed car body, it is to be understood that I do not desire to limit myself to this particular form of opening, for any opening in a closed vehicle body may be controlled by the same ventilator members.

The opposite sides of the opening 15 are formed by the corner posts or pillars 16. Each corner post, adjacent the edge of the roof, is formed with a depression 17, centrally apertured at 18. Each depression and its corner post or pillar has associated therewith similar mounting mechanism and for that reason a description of one mounting will be sufficient. Positioned within the depression or pocket 17 is a mounting bracket 19 which is held in place by means of screws, or the like, 20. This mounting bracket has formed integrally therewith and projecting concentrically therefrom, a hollow bearing boss 21.

A windshield 22, or other similar main ventilator member, is positioned within the opening 15 to be controlled, and is provided at its opposite sides with frame or sash members 23. Each frame or sash member 23 has secured to its upper end flanges 24 by means of screws or the like 25. These flanges 24 are formed as integral projections of a cup-like bracket 26 which is centrally apertured and internally screw-threaded, as at 27, and is formed with a partial peripheral flange 28. Projecting in an opposite direction to the peripheral flange 28 is a hub portion 29.

A pivot pin 30 is formed with a threaded region 31 which is threadedly connected to the aperture 27 of the bracket 26 for connecting the pivot pin to the said bracket. This pivot pin projects in opposite directions from the main body of the bracket 26 and has one smooth surfaced, cylindrical end portion received within the part 21 of the mounting bracket 19. Interposed between the main body of the bracket 28 and the main body of the bracket 19 is a sealing and friction ring or washer 32. This washer 32 surrounds the hub 29 of the bracket 26. The peripheral flange 28 of the bracket 26 is employed for housing one end of an auxiliary ventilator member 33.

This end of the ventilator member is formed with an end plate 34 which is centrally apertured to rotatably receive an enlarged bearing portion 35 formed on the pivot pin 30. Interposed between the end plate 34 of the ventilator 33 and the main body of the bracket 26 is a friction member 36. The inner extremity of the pivot pin 30 is externally screw-threaded, as at 37, for receiving a nut 38 which holds in place, under compression, a spring 39.

It will be noted by inspecting Fig. 1 that two ventilator members 33 are provided and are arranged in axial alignment. These ventilator members 33 are of channel formation and have their outer ends pivotally connected to one of the corner posts or pillars by means of the pivot pin 30 and the associated elements described in detail above.

To support the inner, adjacent ends of the auxiliary ventilators 33, the edge portion of the roof has secured thereto, as by means of screws or the like 40, a flange 41 which projects radially from an arcuate sleeve 42. This sleeve is interrupted at 43 for a purpose to be described at a later point and is provided with a centrally positioned web 44 which is apertured at 45 to provide a bearing opening. The periphery of this web 44 is cut away at 46 to correspond with the cut away portion 43 of the arcuate sleeve 42. The inner, adjacent ends of the auxiliary ventilators 33 are formed with end plates 47 which have secured thereto pivot pins 48. These pivot pins are adapted to be received within the bearing opening 45 of the web 44 to pivotally connect the inner adjacent ends of the auxiliary ventilators 33 to this combined mounting bracket illustrated in detail in Fig. 4. Friction washers 49 are interposed between the outer surfaces of the end plates 47 and the outer faces of the web 44.

Each auxiliary ventilator 33 is provided with an operating grip or handle 50, by means of which the auxiliary ventilators may be independently adjusted. It is to be understood that any other form of mechanism may be employed for actuating these auxiliary ventilators, if desired.

The upper free edge of the main ventilator glass panel 22 is provided with a sealing strip 51. This strip cooperates with the opposite longitudinal edges of the auxiliary ventilators 33 for sealing between these ventilator members and the main ventilator panel 22 when the auxiliary ventilators are arranged in either one of their closed positions, which positions are arranged on opposite sides of the plane of the main ventilator panel 22. The previously described packing or sealing strip 14 is made up in two sections, and each section extends from an edge of the arcuate sleeve 42 to one of the peripheral flanges 28 of a mounting bracket 26. These packing or sealing strips 14 effectively function to prevent leakage of air, moisture, or the like, between the edge portion of the roof 10 and an auxiliary ventilator 33.

It will be noted that the mechanism above described provides three ventilator members for controlling a single opening in a wall of a closed vehicle body. The main ventilator member 22, or windshield, and the auxiliary ventilators 33, may be adjusted independently of each other and the pivot pins 30 constitute common means for movably supporting the main ventilator member 22, or windshield, and the outer ends of the auxiliary ventilators 33. A common mounting bracket is employed for supporting the adjacent ends of the auxiliary ventilators 33. The friction members 32 and 36 function to prevent undesired movement of the main ventilator or windshield 22 with respect to the car body and the auxiliary ventilators 33 with respect to the bracket 26 for the main ventilator. The friction members 49 also function to prevent undesired movement of the auxiliary ventilator members.

In Figs. 5 to 8 inclusive there is shown a modified form of the invention. In this modification, the roof 51 has secured thereto a header 52 which forms the top edge of an opening 53. The side edges of this opening are formed by corner posts 54. A visor, or the like, 55 is secured to the roof 51 and the corner posts 54 in any desired manner. The corner posts are channeled, as at 56, to receive a glass panel 57 which may consist of the windshield panel for the body. The upper edge of this panel 57 is formed with a finishing and sealing strip 58 which is provided with a lateral bead or flange 59. It will be noted that the upper edge of the windshield panel 57 terminates in spaced relation with respect to the lower edge of the header 52 to provide a ventilating opening. At each end of this ventilating opening, there is positioned a mounting bracket 60 which is suitably secured to one of the corner posts 54. Each bracket is provided with a lateral, inwardly extending pivot pin 61, which is received within an aperture formed in an end plate 62 of an auxiliary ventilator member 63. There are two of these auxiliary ventilator members 63 provided and axially aligned to collectively control the passage of air through the ventilator opening located above the upper edge of the windshield panel 57. Each ventilator member 63 is of substantially channel formation and has one of its longitudinal edges shaped to provide a radial sealing flange 64 with a channeled edge portion 65. The opposite longitudinal edge of each channeled ventilator member 63 is formed with a radially extending flange 66. These flanges 64 and 66 cooperate with opposite sides of the finishing and sealing strip 58 mounted on the upper edge of the windshield panel 57 to seal between the ventilator members and the said panel when the ventilator members are arranged in either of their closed positions.

Secured to the header 52 is a flange 67 of a central mounting bracket 68. This mounting bracket is provided with a central web 69 which is centrally apertured at 70 for receiving a pivot pin 71. This pin is provided with a head 72 at one end and has threaded on its other end a nut 73 which holds in place, under compression, a spring 74.

The pivot pin 71 is loosely received in openings 75 formed in end plates 76 of the ventilator members 63. Each end plate has rigidly fastened thereto a pinion 77. The pinions are positioned outwardly of the end plates 76 and chambers to receive these pinions are formed by the axially extending flanges 78 of the central mounting bracket 68. The main web 69 of the mounting bracket 68 has secured thereto a double-ended pin 79 which pivotally supports sector-shaped gear members 80. Each gear member is formed with a radially projecting operating arm 81. The sector-shaped gear members 80 have their peripheral teeth meshing respectively with the teeth of the pinions 77 which are secured to the ventilator members 63.

It will now be seen that the ventilator members 63 may be adjusted independently of each other by independently actuating the gears 80 through their operating arms 81. Due to the positioning of these arms 81 in close proximity to each other, an occupant of the vehicle equipped with this ventilator system may grip both of the arms 81 simultaneously for actuating both ventilators in the same direction or in opposite directions by moving the arms 81 either in the same direction or in opposite directions.

It is to be understood that the forms of this invention herewith shown and described are to be taken as preferred examples of the same and that various changes in the shape, size and arrangement of parts may be resorted to without departing from the spirit of the invention or the scope of the subjoined claims.

Having thus described the invention, I claim:—

1. The combination with a closed vehicle body having a single ventilating opening formed in a wall thereof, of three ventilator members cooperatively associated to collectively control the passage of air through said opening, the horizontal dimension of one of said members being substantially equal to the combined horizontal dimensions of the remaining two members and means for mounting the three ventilator members on the marginal parts of said opening so as to pivot about a common axis.

2. The combination with a closed vehicle body having a frame structure to define an opening in a wall thereof, a glass panel positioned in said opening to bridge a portion of the same and terminating at one edge in spaced relation with respect to one margin of the frame to provide a space not closed by said panel, a pair of axially aligned, independently adjustable, ventilator members positioned in said space to control the passage of air therethrough and to prevent the passage of air when arranged to have edge contact with the glass panel, and means for pivotally supporting the aligned ventilator members and the glass panel on marginal parts of said opening for movement about a common axis.

3. The combination with a closed vehicle body having a single ventilating opening formed in a wall thereof, of three ventilator members cooperatively associated to entirely control the passage of air through said opening, two of said ventilator members being arranged in axial alignment with respect to each other and above the third ventilator member, and common means for pivotally mounting all of said ventilator members on the marginal parts of said opening to cause them to pivot about a common axis.

4. The combination with a closed vehicle body having a single ventilating opening formed in a wall thereof, of three ventilator members cooperatively associated to entirely control the passage of air through said opening, two of said ventilator members being arranged in axial alignment with respect to each other, and three mounting brackets only for pivotally connecting the ventilator members to the marginal parts of said opening to cause them to move about a common axis.

5. The combination with a closed vehicle body having a single ventilating opening formed in a wall thereof, of three ventilator members cooperatively associated to entirely control the passage of air through said opening, two of said ventilator members being arranged in axial alignment with respect to each other, and three mounting devices only for pivotally connecting the three ventilator members to the marginal parts of said opening to cause them to move about a common axis, each of said mounting devices being common to two of said ventilator members.

EDWARD L. KRAFT.